United States Patent
Meng (10) Patent No.: US 10,013,034 B2
(45) Date of Patent: Jul. 3, 2018

(54) HOST CHASSIS AND A HOST

(71) Applicants: BOE TECHNOLOGY GROUP CO., LTD, Beijing (CN); BEIJING BOE CHATANI ELECTRONICS CO., LTD., Beijing (CN)

(72) Inventor: Yingli Meng, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 342 days.

(21) Appl. No.: 14/801,777

(22) Filed: Jul. 16, 2015

(65) Prior Publication Data

US 2016/0227671 A1    Aug. 4, 2016

(30) Foreign Application Priority Data

Feb. 2, 2015 (CN) ..................... 2015 2 0073003 U (51) Int. Cl.
*G06F 1/20* (2006.01)

(52) U.S. Cl.
CPC ..................................... *G06F 1/20* (2013.01)

(58) Field of Classification Search
CPC ...... F24H 3/00; F24H 3/02; F24H 3/04; F28F 7/00; H05K 7/20; H05K 5/00; H05K 5/0039; H05K 5/006; H05K 5/0065; H05K 5/0091; H05K 7/1422; H05K 7/20136; H05K 7/20154; H05K 7/20163; G06F 1/20

USPC .................. 165/121, 122, 803; 361/697, 702
See application file for complete search history.

(56) References Cited

U.S. PATENT DOCUMENTS

| | | | | | |
|---|---|---|---|---|---|
| 3,416,597 | A | * | 12/1968 | Kupferberg | H01L 23/467 165/121 |
| 4,682,268 | A | * | 7/1987 | Okano | H05K 7/20154 361/697 |
| 4,709,560 | A | * | 12/1987 | Voorhis | H05K 7/20154 165/125 |
| 4,790,373 | A | * | 12/1988 | Raynor | H01L 23/467 165/122 |
| 5,502,618 | A | * | 3/1996 | Chiou | H05K 7/20909 307/150 |

(Continued)

*Primary Examiner* — Keith Raymond
*Assistant Examiner* — Gustavo Hincapie Serna
(74) *Attorney, Agent, or Firm* — Womble Bond Dickinson (US) LLP (57) ABSTRACT

An embodiment of the invention provides a host chassis and a host, and refers to a display technical field, which can realize uniform heat dissipation, so as to improve the heat dissipation performance of the host. The host chassis comprises: a hollow column enclosure; heat dissipation covers situated at two ends of the column enclosure, the heat dissipation covers match with the column enclosure; a hollow column heat dissipating barrel which is situated inside the column enclosure and disposed in the same orientation with the column enclosure, the column heat dissipating barrel is used for disposing host accessories and for heat conduction for the host accessories; and a cooling fan fixed at one end of the column heat dissipating barrel, the fan is used for blowing cold air from external environment into the column heat dissipating barrel so as to take away heat.

12 Claims, 4 Drawing Sheets

(56) References Cited

U.S. PATENT DOCUMENTS

| | | | | |
|---|---|---|---|---|
| 5,926,367 | A * | 7/1999 | Gutierrez | G06F 1/189 361/695 |
| 6,091,604 | A * | 7/2000 | Plougsgaard | H02M 7/003 165/185 |
| 6,330,155 | B1 * | 12/2001 | Remsburg | H05K 7/20154 165/276 |
| 6,411,514 | B1 * | 6/2002 | Hussaini | H05K 7/209 165/104.33 |
| 6,439,298 | B1 * | 8/2002 | Li | F28D 15/0233 165/104.21 |
| 6,515,859 | B2 * | 2/2003 | Roberts | H05K 7/20163 165/104.33 |
| 6,992,890 | B2 * | 1/2006 | Wang | G06F 1/20 165/104.26 |
| 7,434,964 | B1 * | 10/2008 | Zheng | F21V 29/006 362/218 |
| 7,654,699 | B2 * | 2/2010 | Chang | F21V 29/02 362/294 |
| 8,143,769 | B2 * | 3/2012 | Li | F21V 29/004 313/46 |
| 8,144,459 | B2 * | 3/2012 | Ji | G06F 1/20 165/80.2 |
| 8,289,708 | B2 * | 10/2012 | Oyama | B23K 9/32 361/692 |
| 8,692,444 | B2 * | 4/2014 | Patel | F21V 3/02 313/46 |
| 8,767,401 | B2 * | 7/2014 | Kim | H05K 7/20909 361/697 |
| 2007/0279862 | A1 * | 12/2007 | Li | F21V 29/004 361/692 |
| 2014/0361672 | A1 * | 12/2014 | Whang | G06F 1/20 312/223.2 |
| 2014/0362523 | A1 * | 12/2014 | Degner | G06F 1/20 361/679.47 |

\* cited by examiner

HOST CHASSIS AND A HOST

TECHNICAL FIELD

The invention refers to a display technical field, and especially to a host chassis and a host.

BACKGROUND

A traditional box-type chassis is provided with heat sinks at multiple locations such as a CPU (Central Processing Unit), a power supply, a mainboard, and a display card, and multiple cooling fans are provided inside the chassis, and heat dissipating holes are distributed on the housing of the chassis or a cooling system is attached outside the host chassis, so that realizes heat dissipation of the host.

SUMMARY

The invention provides a host chassis and a host, which can realize uniform heat dissipation, so as to improve the heat dissipation performance of the host.

To the above end, an embodiment of the invention employs the following technical solution:

In one respect, a host chassis is provided, which comprises: a hollow column enclosure; heat dissipation covers situated at two ends of the column enclosure, the heat dissipation covers match with the column enclosure; a hollow column heat dissipating barrel which is situated inside the column enclosure and disposed in the same orientation with the column enclosure, the column heat dissipating barrel is used for disposing host accessories and for heat conduction for the host accessories; and a cooling fan fixed at one end of the column heat dissipating barrel, the fan is used for blowing cold air from external environment into the column heat dissipating barrel so as to take away heat.

Optionally, the column enclosure is a cylinder enclosure, and the heat dissipation covers are cap-shaped cylinder heat dissipation covers which match with the cylinder enclosure; therein, the cooling fan is situated inside one of the heat dissipation covers.

Preferably, the column heat dissipating barrel includes a supporting barrel and a heat conducting barrel which are embedded into one another; the supporting barrel includes supporting surfaces for disposing the host accessories and adjoining surfaces for contacting with the column enclosure; the heat conducting barrel contacts with the adjoining surfaces of the supporting barrel and is embedded inside the supporting barrel; there are gaps between the supporting surfaces of the supporting barrel and the column enclosure and the heat conducting barrel.

Further preferably, multiple heat sinks are provided inside the heat conducting barrel; therein, air channels running through two ends of the heat conducting barrel are formed between the multiple heat sinks.

Further preferably, the multiple heat sinks are arranged like a sector. Optionally, the supporting barrel includes multiple supporting surfaces and multiple cambered adjoining surfaces adjoining the supporting surfaces; therein, the multiple cambered adjoining surfaces contact completely with the inner surface of the cylinder enclosure.

Further optionally, the heat conducting barrel is a hollow heat conducting barrel of polygon prism, and at least three side edges of the heat conducting barrel of polygon prism get stuck at the at least three adjoining surfaces of the supporting barrel respectively.

Preferably, guide slots are provided on the adjoining surfaces of the supporting barrel, and the heat conducting barrel is mounted in the supporting barrel by inserting the side edges of the heat conducting barrel into the guide slots.

Further preferably, the supporting barrel includes three supporting surfaces and three cambered adjoining surfaces adjoining the supporting surfaces, and the heat conducting barrel is a heat conducting barrel of triangular prism; therein, three sides of the heat conducting barrel of triangular prism are parallel to the three supporting surfaces of the supporting barrel respectively.

Optionally, the heat dissipating covers include a first heat dissipating cover provided at the same side with the cooling fan and a second heat dissipating cover provided at a different side with the cooling fan; therein, a heat dissipating hole is provided at the center of the heat dissipating cover, and multiple ventilation openings are provided at the periphery thereof; therein, the heat dissipating hole and the ventilation openings of the first heat dissipating cover are air inlets, and the heat dissipating hole and the ventilation openings of the second heat dissipating cover are air outlets.

Further optionally, the shape of the ventilation openings includes any of bar, circle and polygon.

In another respect, a host is provided also, comprising the above host chassis.

An embodiment of the invention provides a host chassis and a host. Based on it, since the host accessories inside the host are distributed on the column heat dissipating barrel, and uniform heat conducting are realized by the column heat dissipating barrel, the column heat dissipating barrel can function as a whole heat source, so as to facilitate uniform heat dissipation of the integrated host; based on it, setting of the cooling fan can effectively improve air flow, resulting in rapid convection of the hot and cold air inside and outside the chassis, so as to improve the heat dissipation ability of the host; further, the heat dissipating covers are disposed at two ends of the column enclosure, one end of which can be air inlet and the other end of which can be air outlet; the cold air in external environment can be blown into the column heat dissipating barrel by the cooling fan, and the heat can be exported from the air outlet, which further improves air flow and improves the heat dissipation performance of the host.

Optionally, the host chassis has a shape of sectored column or polygon prism.

Preferably, an interface panel is provided on the outer surface of the column enclosure, for connection of the peripherals.

BRIEF DESCRIPTION OF FIGURES

In order to describe embodiments of the invention or the technical solution in the prior art more clearly, the figures required for description of the embodiments or the prior art will be introduced in brief below. Obviously, the figures in the following description only illustrate some embodiments of the invention, and for those skilled in the art, other figures can be obtained from these figures also without expending creative effort.

LIST OF THE REFERENCE NUMBERS

10: column enclosure; 20: heat dissipating cover; 201: heat dissipating hole; 202: ventilation opening; 30: column heat dissipating barrel; 301: supporting barrel; 302: heat conducting barrel; 303: heat sink; 40: cooling fan.

DETAIL EMBODIMENTS

The technical solution in the embodiment of the invention will be described clearly and completely below in conjunction with figures in the embodiment of the invention. Obviously, the embodiments described are only part of the embodiments of the invention, and not all of the embodiments. All the other embodiments obtained by those skilled in the art based on the embodiments of the invention without making creative effort, belong to the protection scope of this application.

An embodiment of the invention provides a host chassis, as shown in FIGS. 1 to 4, comprising: a hollow column enclosure 10; heat dissipation covers 20 situated at two ends of the column enclosure 10, the heat dissipation covers 20 match with the column enclosure 10; therein, center of the a hollow column heat dissipating barrel which is situated inside the column enclosure and disposed in the same orientation with the column enclosure, the column heat dissipating barrel is used for disposing host accessories and for heat conduction for the host accessories; and a cooling fan fixed at one end of the column heat dissipating barrel, the fan is used for blowing cold air from external environment into the column heat dissipating barrel so as to take away heat.

It should be stated that, firstly, the column enclosure 10, the heat dissipating covers 20 and the column heat dissipating barrel 30 constitute the whole architecture of the host; in order to obtain good heat dissipation performance, the column enclosure 10, the heat dissipating covers 20 and the column heat dissipating barrel 30 (especially the column heat dissipating barrel 30) preferably employ materials having high heat conducting coefficient, specifically copper material or aluminum material or aluminum alloy.

Secondly, the column enclosure 10 has a column structure, and specifically can have cylinder shape, sectored column shape, or polygon prism shape, etc., which is not limited in detail. Based on this, the heat dissipating covers 20 at two ends of the column enclosure 10 match with the column enclosure 10, so as to constitute external structure of the host; therein, the heat dissipating covers 20 and the host enclosure 10 are fixed by way of thread, hook or the like.

Figure 4:
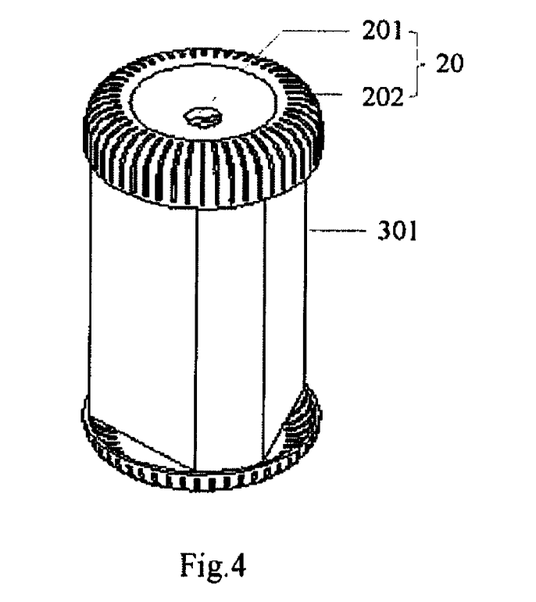
FIG. 4 is a yet another internal construction schematic view of a host provided by an embodiment of the invention.

Thirdly, as shown in FIG. 4 specifically, a heat dissipating hole 201 is provided at the center of the heat dissipating cover 20, and is mainly used for air convection between interior of the chassis and external environment for realizing heat dissipation, therefore the specific position of the heat dissipating hole 201 should corresponds to the center of column heat dissipating barrel 30. Ventilation openings 202 are provided at peripheral of the heat dissipation covers 20, which can be used to export the heat inside the chassis from top and bottom sides of the host.

The embodiment of the invention provides a host chassis, which comprises: a hollow column enclosure 10; heat dissipation covers 20 situated at two ends of the column enclosure 10, the heat dissipation covers 20 match with the column enclosure 10; therein, a heat dissipating hole 201 is provided at the center of the heat dissipating covers 20, and ventilation openings 202 are provided at the peripheral thereof; a hollow column heat dissipating barrel 30 which is situated inside the column enclosure 10 and disposed in the same orientation with the column enclosure 10, the column heat dissipating barrel 30 is used for disposing host accessories and for heat conduction for the host accessories; and a cooling fan 40 fixed at one end of the column heat dissipating barrel 30, the fan 40 is used for blowing cold air from external environment into the column heat dissipating barrel 30 so as to take away heat.

The host accessories may include a power supply, a mainboard, a hard disk, an optical drive, a display card and a sound card, etc. Based on this, since the host accessories (not shown in the figure) inside the host are distributed on the column heat dissipating barrel 30, and uniform heat conducting are realized by the column heat dissipating barrel 30, the column heat dissipating barrel 30 can function as a whole heat source, so as to facilitate uniform heat dissipation of the integrated host; based on it, setting of the cooling fan 40 can effectively improve air flow, resulting in rapid convection of the hot and cold air inside and outside the chassis, so as to improve the heat dissipation ability of the host; further, the heat dissipating covers 20 are disposed at two ends of the column enclosure 10, one end of which can be air inlet and the other end of which can be air outlet; the cold air in external environment can be blown into the column heat dissipating barrel 30 by the cooling fan 40, and the heat can be exported from the air outlet, which further improves air flow and improves the heat dissipation performance of the host.

Figure 1:
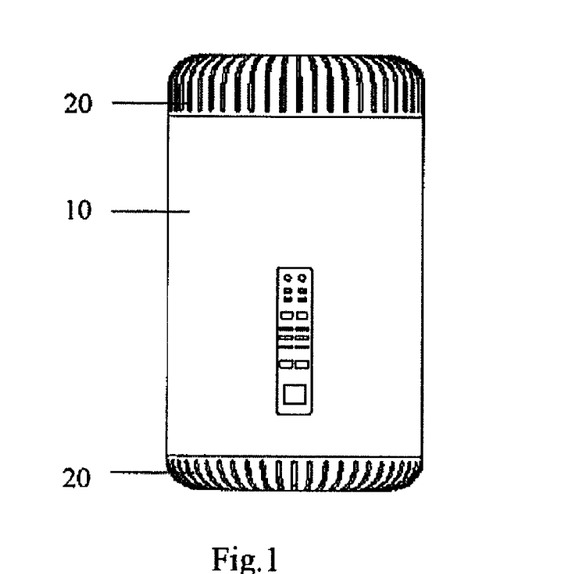
FIG. 1 is an external construction schematic view of a host provided by an embodiment of the invention.

Based on the above description, optionally, as shown in referred FIG. 1, the column enclosure 10 can be a cylinder enclosure; and the heat dissipation covers 20 are cap-shaped cylinder heat dissipation covers 20 which match with the cylinder enclosure; therein, the cooling fan 40 may be situated inside one of the heat dissipation covers 20. In a specific embodiment, both the two heat dissipating covers 20 at two ends of the enclosure 10 are provided one cooling fan 40 (both originates one direction) respectively, so as to improve air flow in the chassis.

As such, the cylinder enclosure and the cap-shaped cylinder heat dissipating covers constitute external structure of the host, so that compared to the cubic host in the prior art, the host provided by the embodiment of the invention has a novel and aesthetic appearance; based on this, the heat dissipating covers 20 at the top and bottom ends of the column enclosure 10 are provided the heat dissipating hole 201 and the ventilation openings 202, and the air flow inside and outside the chassis are improved by the cooling fan 40, so that efficiently improves the heat dissipation ability of the host, and improve its heat dissipating performance.

It should be noted that, the shape of the column enclosure 10 is not limited to the above cylinder, and can be a sectored column or a polygon prism, etc. Exemplarily, when the column enclosure 10 of the host chassis is set as a sectored column, especially a quarter of a cylinder, it can be placed at a corner of a room, so as to save space.

Figure 2:
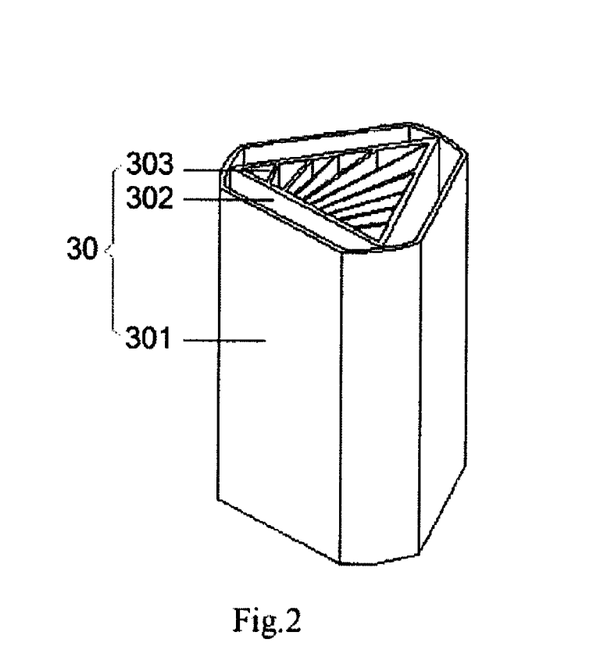
FIG. 2 is an internal construction schematic view of a host provided by an embodiment of the invention.
Figure 3:
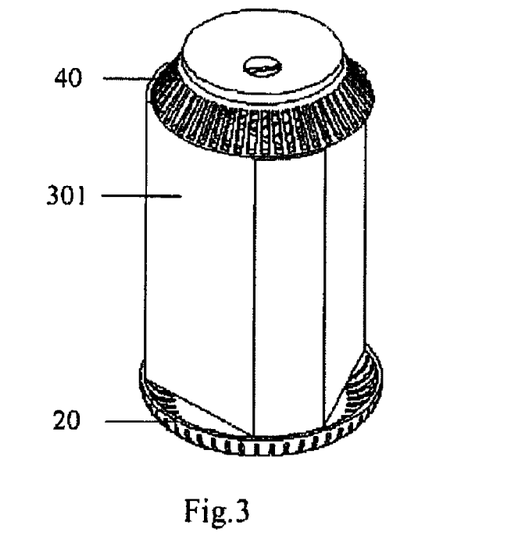
FIG. 3 is another internal construction schematic view of a host provided by an embodiment of the invention.

Optionally, as shown by referred FIG. 2, the column heat dissipating barrel 30 can specifically include a supporting barrel 301 and a heat conducting barrel 302 embedded into one another; the supporting barrel 301 includes supporting surfaces for disposing the host accessories and adjoining surfaces for contacting with the column enclosure 10; the heat conducting barrel 302 contacts with the adjoining surfaces of the supporting barrel 301 and is embedded inside the supporting barrel 301; there are gaps between the supporting surfaces of the supporting barrel 301 and the column enclosure 10 and the heat conducting barrel 302.

It should be noted that, the gaps between the supporting surfaces of the supporting barrel 301 and the column enclosure 10 and the heat conducting barrel 302 provide spaces for the disposing of the host accessories such as CPU, a power supply, a mainboard, a display card and connecting lines and so on, therefore, the sizes of the gaps should be large enough for housing the above components. Besides, the column heat dissipating barrel 30 needs to be fixed inside the column enclosure 10, to ensure the stability of the internal structure of the host chassis; therein, the adjoining surfaces of the supporting barrel 301 should contact with the column enclosure 10, for realizing the embedding of the column heat dissipating barrel 30 inside the column enclosure 10; based on this, other fixation structure, such as sliding pair can be provided between the heat dissipating barrel 30 and the column enclosure 10 to improve the joining therebetween.

As such, the supporting barrel 301 of the column heat dissipating barrel 30 can be used for fixing the host accessories (which are heat sources) such as a CPU, a power supply, mainboard lines and a display card, and since the supporting barrel 301 contacts directly with the heat sources, it can absorb the heat and conduct the heat uniformly to various areas of the supporting barrel 301; further, the supporting barrel 301 can transfer the heat uniformly to the heat conducting barrel 302 which contacts it; based on this, the cooling fan 40 may direct the cold air of the external environment into interior of the chassis, and make it pass through the column heat dissipating barrel 30 and take away the heat, and export the heat from the heat dissipating holes 201 at the center of the heat dissipating covers 20 and the peripheral ventilation openings 202, to realize heat dissipation of the host. Since the host accessories inside the host chassis are directly disposed on the supporting barrel 301, and the supporting barrel 301 and the heat conducting barrel 302 are combined into one body, which may efficiently simplify setting of the system inside the host and avoid disorder of the system.

Based on it, preferably, as shown in FIG. 2, multiple heat sinks 303 are provided inside the heat conducting barrel 302; therein, air channels running through two ends of the heat conducting barrel 302 are formed between the multiple heat sinks 303.

Specifically, the column heat dissipating barrel 30 and the column enclosure 10 both have column structure with top and bottom openings, and the disposing directions of the two are the same (both along the vertical direction); as such, the constituent components of the column heat dissipating barrel 30, i.e. the supporting barrel 301 and the heat conducting barrel 302 are both disposed along the vertical direction also. Based on this, in order to form an up-to-down air flow, the embodiment of the invention disposes the multiple heat sinks 303 in the heat conducting barrel 302 along the vertical direction, to make air channels which penetrate up to down form between the adjacent heat sinks 303, so as to ensure fluent air flow.

As such, the heat dissipation area is efficiently increased by providing multiple heat sinks 303 in the heat conducting barrel 302, so as to improve the heat dissipation performance of the host.

Figure 5A:
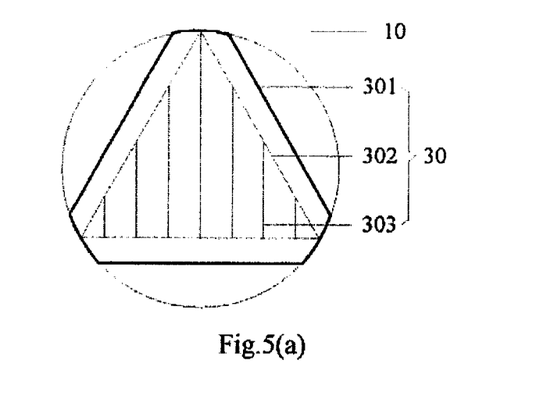
FIGS. 5(a) to 5(c) are schematic views of arrangement of heat sinks provided by the embodiment of the invention.
Figure 5B:
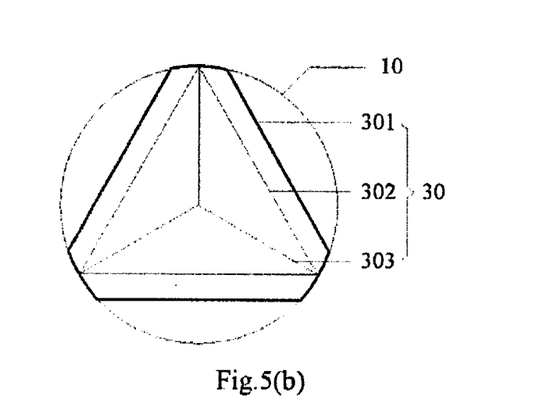
Figure 5C:
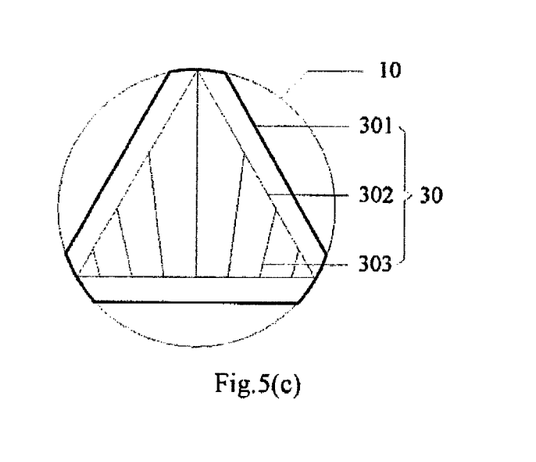

Further, the arrangements of the heat sinks 303 may include a parallel arrangement, a crossover arrangement, and a sectored arrangement as shown in FIGS. 5(*a*) to 5(*c*) and so on. Based on this, the specific number of the heat sinks 303 should be large enough to improve the heat dissipation area and ensure fluent air flow, which should not be limited here.

In the embodiment of the invention, preferably, as shown in FIG. 5(*c*), the multiple heat sinks 303 can be arranged divergently (arranged as a sector). This arrangement can obtain relatively large heat dissipation area.

Optionally, as shown in FIG. 2, the supporting barrel 301 may include multiple supporting surfaces and multiple cambered adjoining surfaces between the adjacent supporting surfaces; therein, the multiple cambered adjoining surfaces contact completely with the inner surface of the cylinder enclosure.

Here, the supporting barrel 301 is preferably produced by extrusion molding with aluminum material having high heat conducting coefficient.

Specifically, the supporting surfaces are used for disposing the host accessories such as CPU, the power supply, the mainboard, the display card and the connecting lines and so on, and the adjoining surfaces is used for jogging with the cylinder enclosure. Of course, the fixing way between the supporting barrel 301 and the cylinder enclosure can be some other way, such as fixing by screw.

In this case, the heat conducting barrel 302 is a hollow heat conducting barrel of polygon prism, and at least three side edges of the heat conducting barrel of polygon prism get stuck at the at least three adjoining surfaces of the supporting barrel 301 respectively.

Since relative fixation is needed between the heat conducting barrel 302 and the supporting barrel 301, and gaps are needed to be reserved between the various sides of the heat conducting barrel 302 and the supporting surfaces of the supporting barrel 301, therefore in case that the heat conducting barrel 302 is a heat conducting barrel of polygon prism, the relative fixing to the supporting barrel 301 can be realized by the side edges of the heat conducting barrel of polygon prism.

Exemplarily, guide slots can be set on the adjoining surfaces of the supporting barrel 301, and the side edges of the supporting barrel 302 can be inserted into the supporting barrel 301 through the guide slots, so as to realize the relative fixation therebetween. Based on this, the relative fixation between the heat conducting barrel of polygon prism and the supporting barrel 301 can be realized only by three side edges of the heat conducting barrel of polygon prism. However, in the embodiment of the invention, multiple side edges can be used for fixing, on condition that the number of the side edges of the heat conducting barrel of polygon prism is smaller or equal to the number of the adjoining surfaces of the supporting barrel 301.

Preferably, the supporting barrel 301 may includes three supporting surfaces and three cambered adjoining surfaces located between the adjacent supporting surfaces, and the heat conducting barrel 302 can be a heat conducting barrel of triangular prism; therein, three sides of the heat conducting barrel of triangular prism are parallel to the three supporting surfaces of the supporting barrel 301 respectively.

Here, the supporting barrel 301 has an integrated molded structure, and the various surfaces thereof have same heat conducting performances, and the heat conducting barrel 302 is a integrated structure.

As such, the three supporting surfaces can be used for disposing the above host accessories, and the above host accessories can be provided with larger space by making the various sides of the heat conducting barrel 302 parallel to the various supporting surfaces of the supporting barrel 301 respectively.

It should be noted that, the shapes of the supporting barrel 301 and the heat conducting barrel 302 are not limited to the shapes described here, and can set as other shapes according to actual requirement.

Optionally, the heat dissipating covers 20 may include a first heat conducting cover provided at the same side with the cooling fan 40 and a second heat dissipating cover provided at a different side with the cooling fan 40; therein, the heat dissipating hole 201 and the ventilation openings 202 of the first heat dissipating cover are air inlets, and the heat dissipating hole 201 and the ventilation openings 202 of the second heat dissipating cover are air outlets.

As such, under action of the cooling fan 40, the cold air in external environment can enter inside of the chassis through the air inlets, and take away the heat through the air outlets by heat exchanging between the cold and hot air.

Figure 6:
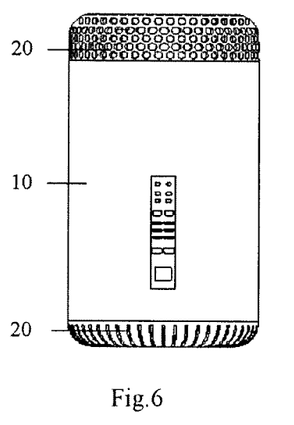
FIG. 6 is an external schematic view of another host provided by an embodiment of the invention.

Based on this, as shown in FIGS. 1 and 6, the shape of the ventilation openings 202 may include any of bar, circle and polygon.

Here, the ventilation openings 202 are used for assisting the heat dissipating hole 201 to export the heat inside the chassis, and efficiently improve the air flow inside and outside the chassis under action of the cooling fan 40, so that improve the heat dissipating ability of the host.

Besides, as can be seen from FIG. 1, an interface panel is provided on the outer surface of the column enclosure, for connection of the peripherals.

An embodiment of the invention also provides a host, comprising the above host chassis and respective host accessories.

Based on it, the host accessories such as CPU can be disposed on the column heat dissipating barrel 30 of the host chassis during host assembling. As such, the column heat dissipating barrel can function as a whole heat source, so as to facilitate realizing heat dissipation of the integrated host; based on it, air flow inside and outside the chassis can effectively improved by the cooling fan 40, so as to improve the heat dissipation ability of the host.

The above describes the specific embodiments of the invention; however the protection scope of the invention is not limited to it. The skilled person who is familiar with this technical field can easily think of variations or substitutions in the technical scope disclosed by the invention, which should be covered in the protection scope of the invention. Therefore, the protection scope of the invention should be defined by the protection scope of the claims.

In the description of the present application, it is understood that the terms used for indicating the orientations or locations, such as "upper", "lower", "inner" and "outer" and so on are based on the orientations or locations shown in the drawings, only for the purpose of facilitating and simplifying the description of the application, rather than indicating or implying that the devices or elements in question have to have specific originations or be operated and constructed in specific originations, which thus cannot be construed to limit the present application. Although in the method claims, various steps are shown in some order, these steps do not necessarily be performed in the order listed, instead can be performed in a reverse or parallel way.

Wording "include" does not exclude the presence of other elements or steps which are not listed in the claims. The wording "a" or "an" ahead of an element does not exclude the presence of a plurality of such elements. The mere fact that certain measures are recited in mutually different dependent claims does not indicate that a combination of these measures cannot be used to advantage. Any reference signs in the claims should not be construed to limit scopes.

The invention claimed is:

1. A host chassis comprising:
   a hollow column enclosure;
   heat dissipation covers situated at two ends of the column enclosure, the heat dissipation covers line up with the column enclosure;
   a hollow column heat dissipating barrel which is situated inside the column enclosure and disposed in the same orientation with the column enclosure, the column heat dissipating barrel is used for disposing host accessories and for heat conduction for the host accessories;
   and a cooling fan fixed at one end of the column heat dissipating barrel, the fan is used for blowing cold air from external environment into the column heat dissipating barrel so as to take away heat;
   wherein the column heat dissipating barrel includes a supporting barrel and a heat conducting barrel which are embedded into one another;
   the supporting barrel includes supporting surfaces for disposing the host accessories and adjoining surfaces for contacting with the column enclosure;
   the heat conducting barrel contacts with the adjoining surfaces of the supporting barrel and is embedded inside the supporting barrel;
   there are gaps between the supporting surfaces of the supporting barrel and each of the column enclosure and the heat conducting barrel.

2. The host chassis according to claim 1, wherein the column enclosure is a cylinder enclosure, and the heat dissipation covers are cap-shaped cylinder heat dissipation covers which line up with the cylinder enclosure; wherein the cooling fan is situated inside one of the heat dissipation covers.

3. The host chassis according to claim 2, wherein multiple heat sinks are provided inside the heat conducting barrel;
   wherein air channels running through two ends of the heat conducting barrel are formed between the multiple heat sinks.

4. The host chassis according to claim 3, wherein the multiple heat sinks are arranged like a sector.

5. The host chassis according to claim 2, wherein the supporting barrel includes multiple supporting surfaces and multiple cambered adjoining surfaces adjoining the supporting surfaces;
   wherein the multiple cambered adjoining surfaces contact completely with the inner surface of the cylinder enclosure.

6. The host chassis according to claim 5, wherein the heat conducting barrel is a hollow heat conducting barrel of polygon prism, and at least three side edges of the heat conducting barrel of polygon prism get stuck at at least three adjoining surfaces of the supporting barrel respectively.

7. The host chassis according to claim 6, wherein the supporting barrel includes three supporting surfaces and three cambered adjoining surfaces adjoining the supporting surfaces, and the heat conducting barrel is a heat conducting barrel of triangular prism; three sides of the heat conducting barrel of triangular prism are parallel to the three supporting surfaces of the supporting barrel respectively.

8. The host chassis according to claim 1, wherein the heat dissipating covers include a first heat dissipating cover provided at the same side with the cooling fan and a second heat dissipating cover provided at a different side with the cooling fan; wherein a heat dissipating hole is provided at the center of the heat dissipating cover, and multiple ventilation openings are provided at the periphery thereof;

wherein the heat dissipating hole and the ventilation openings of the first heat dissipating cover are air inlets, and the heat dissipating hole and the ventilation openings of the second heat dissipating cover are air outlets.

9. The host chassis according to claim 8, wherein the shape of the ventilation openings includes any of bar, circle and polygon shapes.

10. The host chassis according to claim 1, wherein the host chassis has a shape of sectored column or polygon prism.

11. The host chassis according to claim 1, wherein an interface panel is provided on the outer surface of the column enclosure, for connection of external components.

12. A host, comprising the host chassis according to claim 1.

* * * * *